US012065944B1

(12) United States Patent
Spangler et al.

(10) Patent No.: US 12,065,944 B1
(45) Date of Patent: Aug. 20, 2024

(54) AIRFOILS WITH MIXED SKIN PASSAGEWAY COOLING

(71) Applicant: Raytheon Technologies Corporation, Farmington, CT (US)

(72) Inventors: Brandon W. Spangler, Vernon, CT (US); Dominic J. Mongillo, Jr., West Hartford, CT (US); Jaime G. Ghigliotty Rosado, Cabo Rojo, PR (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/118,706

(22) Filed: Mar. 7, 2023

(51) Int. Cl.
*F01D 5/18* (2006.01)

(52) U.S. Cl.
CPC ........ *F01D 5/186* (2013.01); *F05D 2220/323* (2013.01); *F05D 2230/21* (2013.01); *F05D 2230/60* (2013.01); *F05D 2260/202* (2013.01); *F05D 2300/17* (2013.01)

(58) Field of Classification Search
CPC ............... F01D 5/186; F05D 2220/323; F05D 2230/21; F05D 2230/60; F05D 2260/202; F05D 2300/17
See application file for complete search history.

(56) References Cited

U.S. PATENT DOCUMENTS

| | | | |
|---|---|---|---|
| 5,156,526 A | 10/1992 | Lee et al. | |
| 5,246,340 A | 9/1993 | Winstanley et al. | |
| 5,296,308 A | 3/1994 | Caccavale et al. | |
| 6,206,638 B1 | 3/2001 | Glynn et al. | |
| 6,290,463 B1 | 9/2001 | Fargher et al. | |
| 6,626,230 B1 | 9/2003 | Woodrum et al. | |
| 7,131,818 B2 | 11/2006 | Cunha et al. | |
| 7,141,812 B2 | 11/2006 | Appleby et al. | |
| 7,217,092 B2 | 5/2007 | Lee et al. | |
| 7,293,961 B2 * | 11/2007 | Lee | F01D 5/187 415/115 |
| 7,871,245 B2 | 1/2011 | Pietraszkiewicz et al. | |
| 8,070,442 B1 * | 12/2011 | Liang | F01D 5/187 416/97 R |
| 9,115,590 B2 | 8/2015 | Spangler et al. | |
| 9,272,324 B2 | 3/2016 | Merrill et al. | |
| 9,739,155 B2 | 8/2017 | Smith et al. | |
| 9,988,913 B2 | 6/2018 | Spangler | |
| 9,995,149 B2 | 6/2018 | Foster et al. | |
| 10,207,315 B2 | 2/2019 | Appleby et al. | |

(Continued)

FOREIGN PATENT DOCUMENTS

| | | |
|---|---|---|
| WO | 2016/122483 A1 | 8/2016 |

*Primary Examiner* — Aaron R Eastman
(74) *Attorney, Agent, or Firm* — Bachman & LaPointe, P.C.

(57) ABSTRACT

A turbine engine airfoil element has: a plurality of spanwise main body passageways along a camber line; and a plurality of spanwise skin passageways along the pressure side. The spanwise skin passageways include: first skin passageways each having a plurality of film cooling outlets to the pressure side; and second skin passageways each lacking film cooling outlets to the pressure side. Linking passageways extend between the first skin passageways and the second skin passageways. The first skin passageways and second skin passageways are directly fed from one or more inlets of the airfoil element.

25 Claims, 9 Drawing Sheets

(56) References Cited

U.S. PATENT DOCUMENTS

| | | | | |
|---|---|---|---|---|
| 10,252,328 | B2 | 4/2019 | Propheter-Hinckley | |
| 10,378,364 | B2 | 8/2019 | Spangler et al. | |
| 10,731,474 | B2 | 8/2020 | Kohli et al. | |
| 10,871,074 | B2 | 12/2020 | Spangler et al. | |
| 11,111,857 | B2 | 9/2021 | Spangler | |
| 11,149,550 | B2 | 10/2021 | Spangler et al. | |
| 11,220,912 | B2 | 1/2022 | Spangler | |
| 11,286,793 | B2 | 3/2022 | Spangler et al. | |
| 11,459,897 | B2 | 10/2022 | Spangler et al. | |
| 11,499,434 | B2 | 11/2022 | Dyson et al. | |
| 2008/0175714 | A1* | 7/2008 | Spangler | F01D 5/187<br>416/232 |
| 2014/0093392 | A1 | 4/2014 | Tibbott et al. | |
| 2015/0354372 | A1 | 12/2015 | Quach et al. | |
| 2017/0335692 | A1 | 11/2017 | King et al. | |
| 2018/0112547 | A1* | 4/2018 | Snider | F01D 5/147 |
| 2019/0169994 | A1* | 6/2019 | Whitfield | F01D 5/187 |
| 2019/0186291 | A1* | 6/2019 | LoRicco | F01D 9/041 |
| 2019/0316472 | A1* | 10/2019 | Xu | F01D 9/041 |
| 2020/0347734 | A1 | 11/2020 | Spangler et al. | |
| 2021/0140323 | A1 | 5/2021 | Spangler et al. | |
| 2021/0324741 | A1 | 10/2021 | Spangler | |
| 2022/0403746 | A1 | 12/2022 | Spangler et al. | |

* cited by examiner

AIRFOILS WITH MIXED SKIN PASSAGEWAY COOLING

BACKGROUND

The disclosure relates to gas turbine engines. More particularly, the disclosure relates to airfoil cooling passageways and their manufacture.

Gas turbine engines (used in propulsion and power applications and broadly inclusive of turbojets, turboprops, turbofans, turboshafts, industrial gas turbines, and the like) internally-cooled hot section components. Key amongst these components are turbine section blades and vanes (collectively airfoil elements). Such cooled airfoil elements typically include generally spanwise/radial feed passageways with outlets (e.g., film cooling outlets) along the external surface of the airfoil. In typical designs, the feed passageways are arrayed streamwise along the camber line between the leading edge and the trailing edge. In many airfoils, along the leading edge there is an impingement cavity fed by a leading feed passageway. Similarly, there may be a trailing edge discharge slot fed by a trailing feed passageway.

In various situations, the number of spanwise passageways may exceed the number of feed passageways if one of the passageways serpentines (e.g., a blade passageway having an up-pass leg from the root, a turn near the tip, and then a down-pass leg heading back toward the root). In some such implementations, the down-pass may, for example, feed the trailing edge discharge slot.

Whereas blades will have cooling passageway inlets along their roots (e.g., dovetail or firtree roots) with feed passageway trunks extending spanwise/radially outward from the root and into the airfoil, depending on implementation, vanes may more typically have inlets along an outer diameter (OD) shroud so that the feed passageways extend spanwise/radially inward.

However, there are alternatives including cantilevered vanes mounted at their outer diameter ends (e.g., for counter-rotating configurations) and the like.

U.S. Pat. No. 5,296,308, Mar. 22, 1994, to Caccavale et al. and entitled "Investment Casting Using Core with Integral Wall Thickness Control Means", (the '308 patent), shows a ceramic feedcore having spanwise sections for casting associated passageways. Additionally, the sections have protruding bumpers to space the feedcore centrally within an investment die for overmolding.

Additional forms of airfoil elements lack the traditional single grouping of upstream-to-downstream spanwise passages along the camber line of the airfoil. Instead, walls separating passages may have a lattice-like structure when viewed in a radially inward or outward view.

One example includes U.S. patent Ser. No. 10/378,364, Aug. 13, 2019, to Spangler et al. and entitled "Modified Structural Truss for Airfoils", (the '364 patent), the disclosure of which is incorporated by reference herein in its entirety as if set forth at length. Viewed in a spanwise/radial inward or outward section, the '364 patent shows a streamwise series of main air passageways falling along the camber line. In a particular illustrated example, three of those passageways have approximately a rounded-corner convex quadrilateral cross-section/footprint with an opposite pair of corners falling approximately along the camber line so that the leading corner of one passageway is adjacent the trailing corner of another.

Along the pressure and suction side, a series of respective rounded-corner triangular cross-section passageways (skin passageways) alternate with the main passageways with a base of the triangle approximately parallel to and spaced apart from the adjacent pressure or suction side and the opposite corner of the triangle pointed inward to create thin walls between such triangular passageway and the adjacent two main passageways. Depending upon implementation, the '364 configuration may be cast by a ceramic casting core assembly where a main feedcore forms the main passageways and any additional adjacent passageways falling along the camber line. A pressure side core and a suction side core may form the respective associated triangular passageways. Each such pressure side core or suction side core may have spanwise triangular section segments linked by core tie sections at spanwise intervals.

In some embodiments, the main passageways and the skin passageways may extend all the way to associated inlets (e.g., at an ID face of a blade root). In some embodiments, they remain intact/discrete all the way from the inlets and into the airfoil. In other embodiments, various of the passageways may merge (merger being viewed in the upstream direction of airflow through the passageways; with the passageways branching from trunks when viewed in the downstream airflow direction). One example of discrete intact passageways from inlets in a root is shown in U.S. patent Ser. No. 11/149,550, Oct. 19, 2021, to Spangler et al. and entitled "Blade neck transition", (the '550 patent), the disclosure of which is incorporated by reference herein in its entirety as if set forth at length.

Another example of passageway layout is shown in U.S. patent Ser. No. 11/111,857, Sep. 7, 2021, to Spangler and entitled "Hourglass airfoil cooling configuration", (the '857 patent), the disclosure of which is incorporated by reference herein in its entirety as if set forth at length.

SUMMARY

One aspect of the disclosure involves a turbine engine airfoil element comprising: an airfoil having: a pressure side and a suction side; and a plurality of spanwise passageways. The spanwise passageways include: a plurality of main body passageways along a camber line, and a plurality of skin passageways along the pressure side. The plurality of skin passageways along the pressure side comprise: first skin passageways each having a plurality of film cooling outlets to the pressure side; and second skin passageways each lacking film cooling outlets to the pressure side. Linking passageways are along the pressure side between the first skin passageways and the second skin passageways. The first skin passageways and second skin passageways are directly fed from one or more inlets of the airfoil element.

In a further embodiment of any of the foregoing embodiments, additionally and/or alternatively, at at least one spanwise location, the second skin passageways have lower cross-sectional areas than the first skin passageways.

In a further embodiment of any of the foregoing embodiments, additionally and/or alternatively, the second skin passageways have lower average cross-sectional areas than the first skin passageways.

In a further embodiment of any of the foregoing embodiments, additionally and/or alternatively, the second skin passageways mean cross-sectional areas are 20% to 75% of the first skin passageways average cross-sectional areas.

In a further embodiment of any of the foregoing embodiments, additionally and/or alternatively, the plurality of skin passageways along the pressure side comprises at least two said second skin passageways and at least two said first skin passageways.

In a further embodiment of any of the foregoing embodiments, additionally and/or alternatively, the plurality of spanwise passageways further include a plurality of suction side passageways including: first skin passageways each having a plurality of film cooling outlets to the suction side; and second skin passageways each lacking film cooling outlets to the suction side. The airfoil further has a plurality of linking passageways along the suction side between the suction side first skin passageways and the suction side second skin passageways.

In a further embodiment of any of the foregoing embodiments, additionally and/or alternatively, the pressure side skin passageways and the suction side skin passageways have rounded-corner triangular or quadrilateral cross-section.

In a further embodiment of any of the foregoing embodiments, additionally and/or alternatively, the pressure side first skin passageways have a median transverse dimension at least 2.0 mm and the pressure side second skin passageways have a median transverse dimension not more than 1.5 mm.

In a further embodiment of any of the foregoing embodiments, additionally and/or alternatively, the turbine engine airfoil element comprises four to ten said pressure side skin passageways and four to ten said suction side skin passageways.

In a further embodiment of any of the foregoing embodiments, additionally and/or alternatively: adjacent pressure side passageways connect to each other via a plurality of linking passageways; adjacent suction side passageways connect to each other via a plurality of linking passageways; and the linking passageways extend less deeply into the airfoil cross-section than do the adjacent pressure or suction side passageways.

In a further embodiment of any of the foregoing embodiments, additionally and/or alternatively, the first skin passageways and the second skin passageways each extend over at least 50% of a span of the airfoil.

In a further embodiment of any of the foregoing embodiments, additionally and/or alternatively, the turbine engine airfoil element is a blade having an attachment root: the main body passageways extend from associated inlets at an inner diameter (ID) end of the root; and the first and second pressure side passageways and first and second suction side passageways extend from associated inlets at the inner diameter (ID) end of the root.

In a further embodiment of any of the foregoing embodiments, additionally and/or alternatively, a turbine engine includes the turbine engine airfoil element.

In a further embodiment of any of the foregoing embodiments, additionally and/or alternatively, the turbine engine airfoil element is a turbine section blade or vane.

In a further embodiment of any of the foregoing embodiments, additionally and/or alternatively, a method for manufacturing the turbine engine airfoil element comprises: assembling to each other: a feedcore having sections for forming the plurality of main body passageways; and a skin core having sections for forming the plurality of plurality of skin passageways and linking passageways; overmolding the assembly with a fugitive; shelling the fugitive to form a shell; casting alloy in the shell; and deshelling and decoring the cast alloy.

In a further embodiment of any of the foregoing embodiments, additionally and/or alternatively, the fugitive is wax and the shell is dewaxed prior to the casting.

In a further embodiment of any of the foregoing embodiments, additionally and/or alternatively, the method further comprises: molding the feedcore, the pressure side skin core, and the suction side skin core of ceramic material.

In a further embodiment of any of the foregoing embodiments, additionally and/or alternatively, a method for using the turbine engine airfoil element comprises: driving an airflow through the plurality of spanwise passageways; said airflow exiting through the plurality of outlets; said airflow passing from the second skin passageways to the first skin passageways through the linking passageways.

In a further embodiment of any of the foregoing embodiments, additionally and/or alternatively, from at least one of the second skin passageways, said airflow passes to two adjacent said first skin passageways.

Another aspect of the disclosure involves a method for using a turbine engine airfoil element, the turbine engine airfoil element comprising: an airfoil having: a pressure side and a suction side; and a plurality of spanwise passageways. The plurality of spanwise passageways include: a plurality of main body passageways along a camber line; and a plurality of skin passageways along the pressure side. The plurality of skin passageways along the pressure side comprise: first skin passageways each having a plurality of film cooling outlets to the pressure side; and second skin passageways. Linking passageways extend between the first skin passageways and the second skin passageways. The method comprises: driving an airflow through the plurality of spanwise passageways from one or more inlets; said airflow exiting through the plurality of outlets; and said airflow passing from the second skin passageways to the first skin passageways through the linking passageways so that a majority of airflow entering the second passageways passes to the first passageways.

Another aspect of the disclosure involves a turbine engine airfoil element comprising: an airfoil having: a pressure side and a suction side; and a plurality of spanwise passageways including. The plurality of spanwise passages include: a plurality of main body passageways along a camber line; a plurality of skin passageways along the pressure side and comprising: first skin passageways each having a plurality of drilled film cooling outlets to the pressure side; and second skin passageways each lacking film cooling outlets to the pressure side. Linking passageways extend between the first skin passageways and the second skin passageways, wherein the first skin passageways and second skin passageways provide means for improving drilling intersection of the drilled film cooling outlets with the first skin passageways.

Another aspect of the disclosure involves a turbine engine component comprising: a gaspath-facing side; and a plurality of passageways. The plurality of passageways include: a plurality of main body passageways along a camber line; and a plurality of skin passageways along the gaspath-facing side. The skin passageways comprise: first skin passageways each having a plurality of drilled film cooling outlets to the gaspath-facing side and/or having at least six film cooling outlets; and second skin passageways each lacking film cooling outlets to the gaspath-facing side and/or having no more than three film cooling outlets; and linking passageways between the first skin passageways and the second skin passageways. The first skin passageways and second skin passageways provide means for improving drilling intersection of the drilled film cooling outlets with the first skin passageways and/or the second skin passageways are fed from inlets other than the linking passageways.

In a further embodiment of any of the foregoing embodiments, additionally and/or alternatively, the plurality of skin passageways are generally parallel to each other and sequentially arrayed from upstream to downstream along the gaspath.

In a further embodiment of any of the foregoing embodiments, additionally and/or alternatively, the turbine engine component is an airfoil element having an airfoil; the gaspath-facing side is a pressure side of the airfoil. Alternatively, it may be a non-airfoil cooled strut and the gaspath-facing side is lateral side of the strut. Alternatively, it may be a blade outer air seal (BOAS) and the gaspath-facing side is an inner diameter (ID) face of the BOAS.

The details of one or more embodiments are set forth in the accompanying drawings and the description below. Other features, objects, and advantages will be apparent from the description and drawings, and from the claims.

Figure 1:
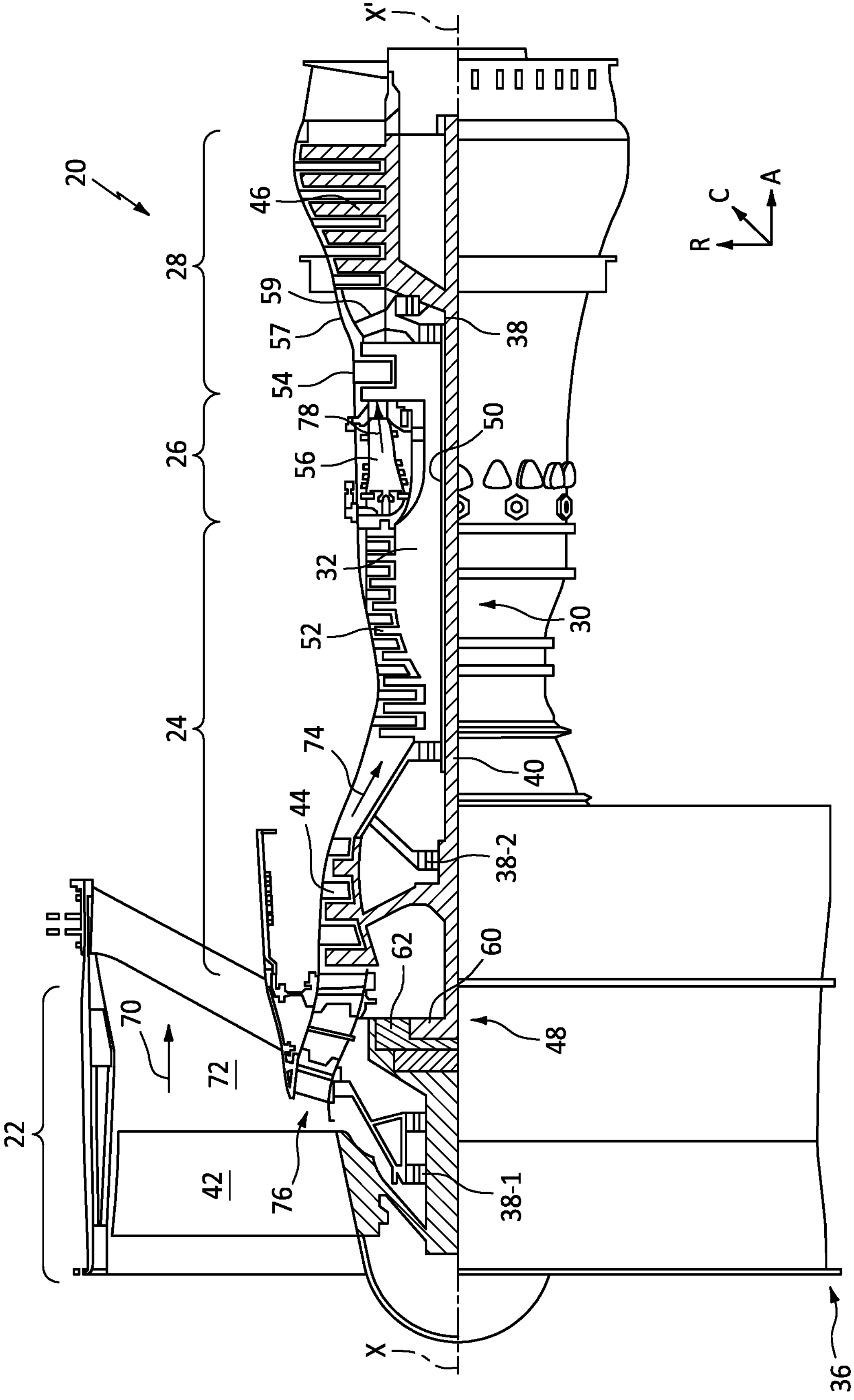
FIG. 1 is a cross-sectional view of an example gas turbine engine, in accordance with various embodiments.

Some of the sectional views show out of plane features for purposes of illustration.

Like reference numbers and designations in the various drawings indicate like elements.

DETAILED DESCRIPTION

Discussed further below, the machining (e.g., drilling) of film cooling holes into skin passageways has attendant issues of the precision of drilling. In some potentially desirable configurations of passageway, the precision of location of film cooling hole drilling may be insufficient to provide a desired consistency of the film cooling hole properly intersecting the target skin passageway. With reference to a hypothetical baseline passageway configuration of generally similar cross-sectional size passageways, a modification of the baseline may shrink some passageways while increasing the size of others. Film cooling holes may be omitted for the smaller passageways thus allowing a larger target and greater chance of appropriate intersection for drilled film cooling holes intersecting the larger passageways. The dimensional change between the two sets of passageways may involve a change in total cross-sectional area or just the projected area normal to the drilling direction (this latter aspect being more representative of the target size).

Additionally, the spanwise skin passageway legs of the baseline may be connected by linking passageways formed by core ties of the original casting core that cast the skin passageways as a group. To the extent that the baseline skin passageways each have film cooling outlets, there may be little pressure difference between adjacent skin passageway legs in the baseline. Thus, there may be little, if any, flow through the linking passageway in the baseline.

However, in the revised configuration, the reduction of outlet count in the reduced size skin passageway legs and the outlet count increase in the enlarged skin passageway legs creates a pressure difference between each enlarged passageway leg and its adjacent decreased passageway leg(s) and vice versa. Higher pressure in the reduced passageway legs causes flow (or increases flow) through the linking passageways to the enlarged passageway legs. This flow may improve cooling of the associated pressure side or suction side wall of the airfoil.

In a particular example discussed below, all film cooling outlets are removed in the reduced size skin passageway legs relative to the baseline. Depending upon manufacturing technique, there still may be a small number of penetrations from the reduced size legs to the associated side of the airfoil caused by core bumpers. An example number of such non-film cooling penetrations per leg is zero to three. The use of bumpers does not necessarily cause penetrations but will at least cause wall thickness reductions. In contrast, the film cooling hole count per passageway leg may be an example six to twenty, more particularly, eight to sixteen. The higher spanwise density (lower spanwise spacing) of outlet holes causes better film coverage, reducing the film temperature on the part.

Notwithstanding the lack of film cooling holes on the reduced size skin passageway legs, there may still be associated tip outlets from said legs. In some implementations, these may be drilled outlets. In other implementations, these may be cast by reduced thickness portions of the casting core that intervene between the associated skin core leg of the casting core and shell material adjacent the tip.

The detailed description of example embodiments herein makes reference to the accompanying drawings, which show example embodiments by way of illustration and their best mode. While these example embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase “at least one of A or B” can include any of “A” only, “B” only, or “A and B.”

With reference to FIG. 1, a gas turbine engine 20 is provided. As used herein, “aft” refers to the direction associated with the tail (e.g., the back end) of an aircraft, or generally, to the direction of exhaust of the gas turbine engine. As used herein, “forward” refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air (bypass air flow) 70 along a bypass flow-path 72 while the compressor section 24 drives air (air flow) 74 along a core flow-path 76 for compression and communication into the combustor section 26 (for mixing with fuel and combusting) then expansion of the combustion gas 78 through the turbine section 28. Although depicted as a turbofan gas turbine engine 20 herein, it should be understood that the concepts described herein are not limited to use with turbofans as the teachings may be applied to other types of turbine engines including three-spool architectures and turboshaft or industrial gas turbines with one or more spools.

The gas turbine engine 20 generally comprise a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear housing 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow is compressed by the low pressure compressor section 44 then the high pressure compressor 52, mixed and burned with fuel in the combustor 56, then the resulting combustion gas 78 is expanded over the high pressure turbine 54 and the low pressure turbine 46. The mid-turbine frame 57 includes airfoils 59 which are in the core flow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are examples of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2:
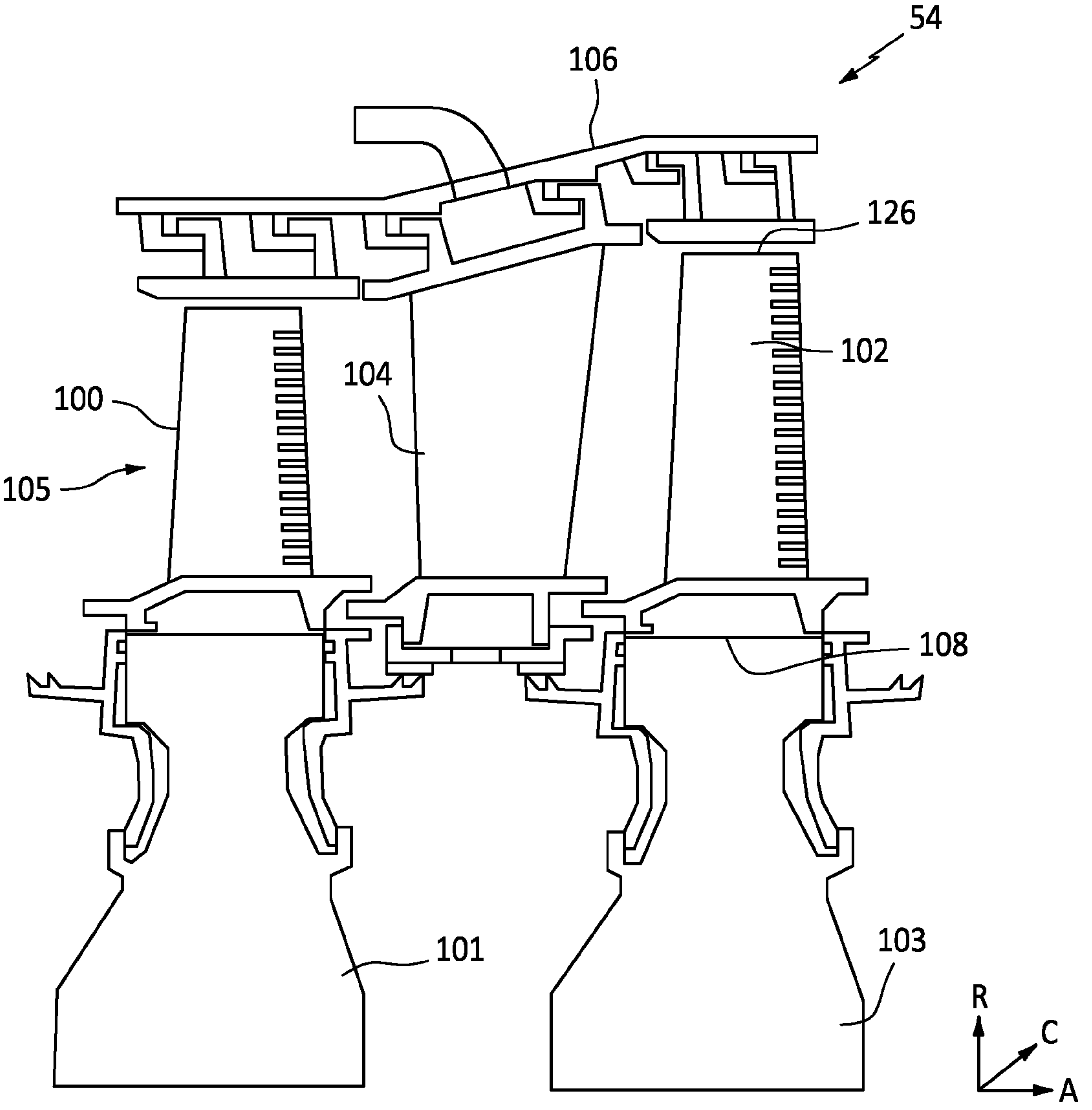
FIG. 2 is a cross-sectional view of a portion of a high pressure turbine section of the gas turbine engine of FIG. 1, in accordance with various embodiments.

Referring now to FIGS. 1 and 2, the high pressure turbine section 54 may include multiple blades 105 including multiple rows, or stages, of blades including a first blade 100 and a second blade 102, along with rows, or stages, of vanes located therebetween including a vane 104. The blades 100, 102 may be coupled to disks 101, 103 respectively which facilitate rotation of the blades 100, 102 about the axis X-X'. The vane 104 may be coupled to a case 106 and may remain stationary relative to the axis X-X'.

The blade 102 may include an inner diameter edge 108 and an outer diameter edge 126 Due to relatively high temperatures within the high pressure turbine section 54, it may be desirable for the blade 102 (and the vane 104) to receive a flow of cooling air. In that regard, the blade 102 may receive a cooling airflow from the inner diameter edge 108 or the outer diameter edge 126. The blade 102 may define cavities that transport the cooling airflow through the blade 102 to the other of the inner diameter edge 108 or the outer diameter edge 126.

Improved cooling passages will be described throughout the disclosure with reference to the blade 102. However, one skilled in the art will realize that the cooling passage design implemented in the blade 102 may likewise be implemented in the vane 104, or any airfoil (including a rotating blade or stationary vane) in any portion of the compressor section 24 or the turbine section 28.

Figure 3:
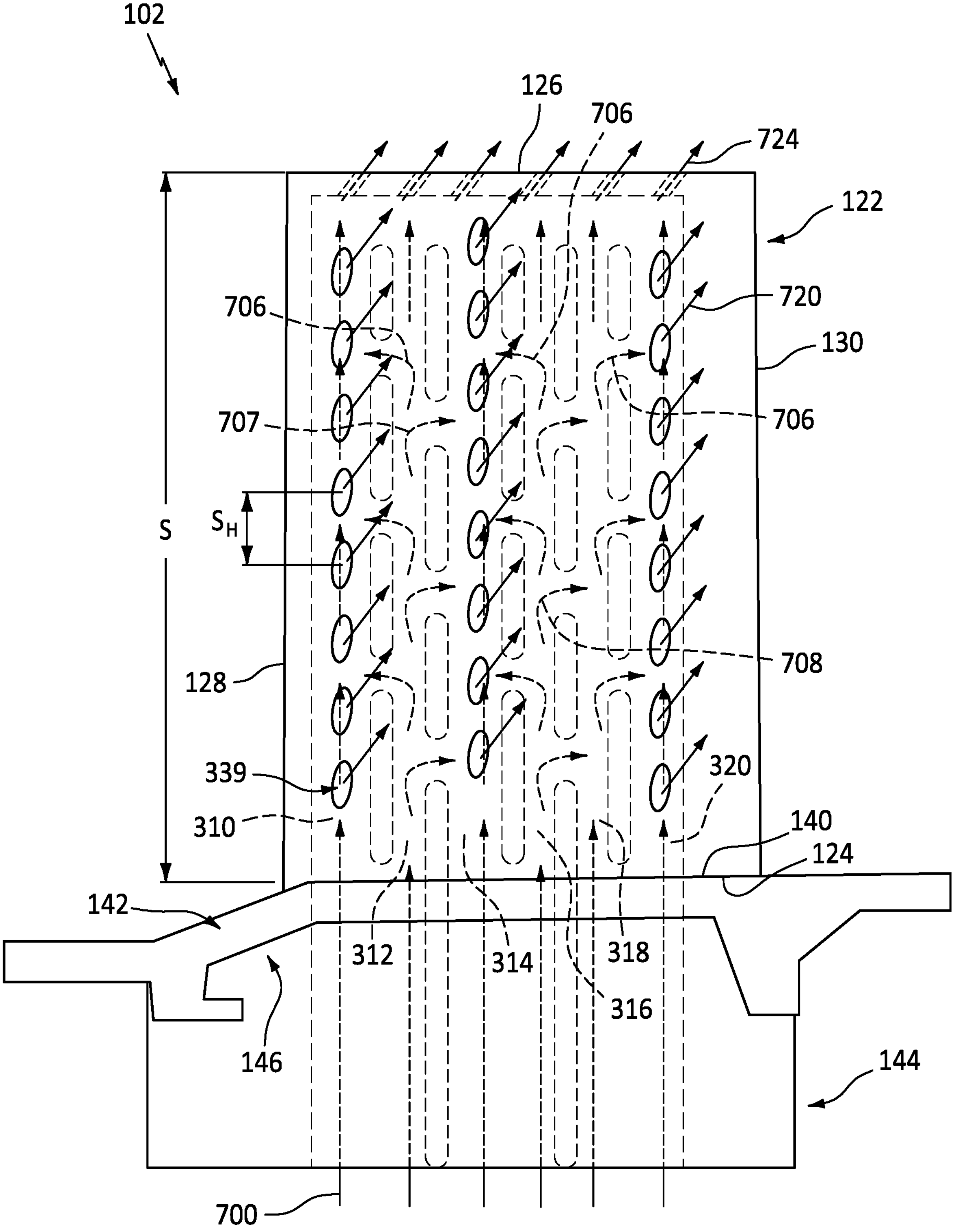
FIG. 3 is a schematic side view of a turbine blade for the high pressure turbine section of FIG. 2.

Turning now to FIG. 3, an engine turbine element 102 is illustrated as a blade (e.g., a high pressure turbine (HPT) blade) having an airfoil 122 which extends between an inboard end 124, and an opposing outboard end 126 (e.g., at a free tip), a spanwise distance or span S therebetween extending substantially in the engine radial direction. The airfoil also includes a leading edge 128 and an opposing trailing edge 130. A pressure side 132 (FIG. 4) and an opposing suction side 134 extend between the leading edge 128 and trailing edge 130.

The airfoil inboard end is disposed at the outboard surface 140 (FIG. 3) of a platform 142. An attachment root 144 (e.g., firtree) extends radially inward from the underside 146 of the platform.

The example turbine blade is cast of a high temperature nickel-based superalloy, such as a Ni-based single crystal (SX) superalloy (e.g., cast and machined). As discussed further below, an example of a manufacturing process is an investment casting process wherein the alloy is cast over a shelled casting core assembly (e.g., molded ceramic casting cores optionally with refractory metal core (RMC) components). Example ceramics include alumina and silica. The cores may be fired post-molding/pre-assembly. An example investment casting process is a lost wax process wherein the core assembly is overmolded with wax in a wax die to form a pattern for the blade. The pattern is in turn shelled (e.g., with a ceramic stucco). The shelled pattern (not shown) is dewaxed and hardened (e.g., a steam autoclave dewax followed by kiln hardening or a kiln hardening that also vaporizes or volatilizes the wax). Thereafter, open space in the resulting shell casts the alloy.

The blade may also have a thermal barrier coating (TBC) system (not shown) along at least a portion of the airfoil. An example coating covers the airfoil pressure and suction side surfaces and the gaspath-facing surface of the platform. An example coating comprises a metallic bondcoat (e.g., MCrAlY, e.g., thermal sprayed or cathodic arc sprayed) and one or more layers of ceramic (e.g., a YSZ and/or GSZ, e.g., thermal sprayed and/or vapor deposited such as EB-PVD).

Figure 4:
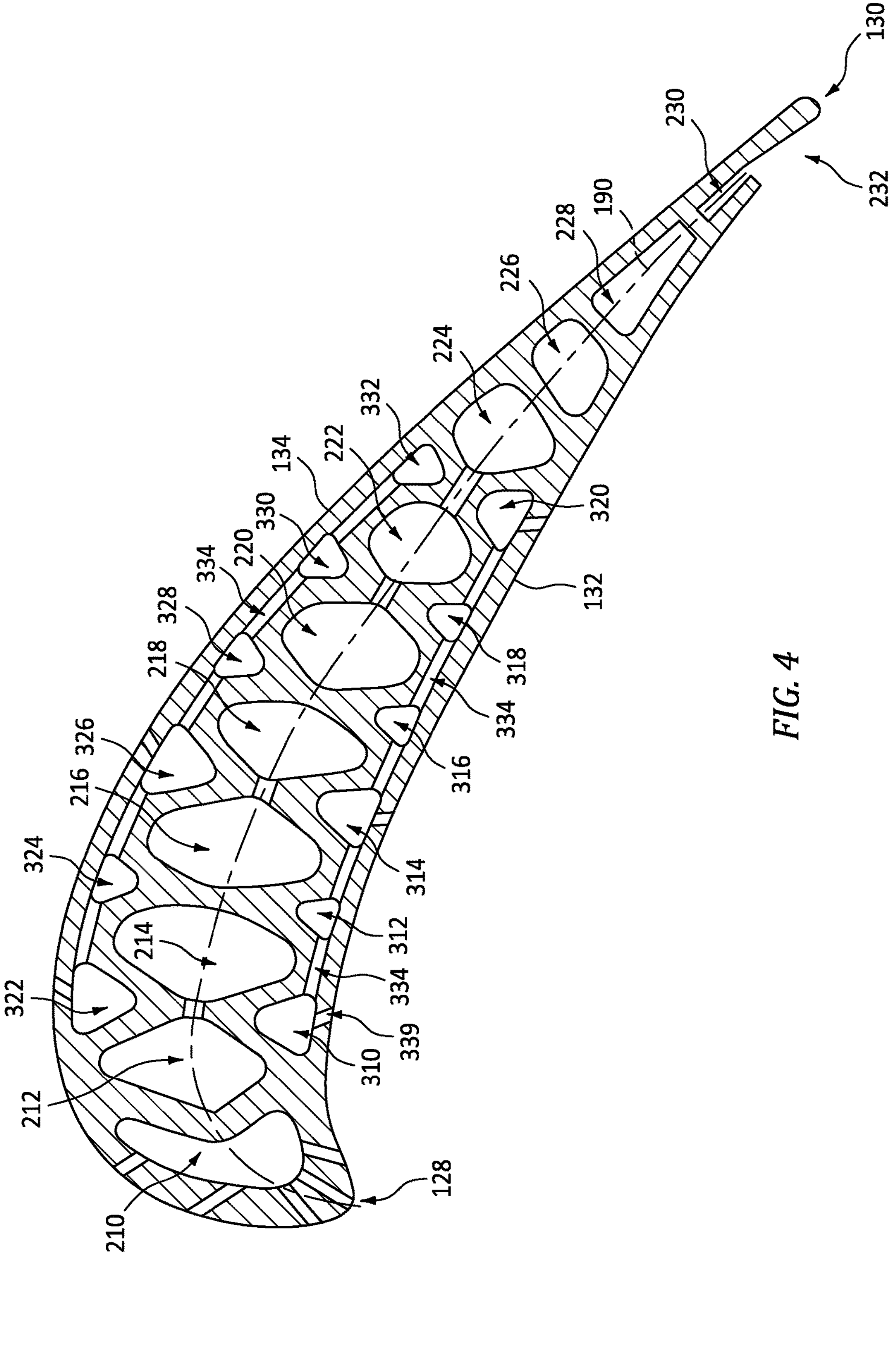
FIG. 4 is a transverse (generally tangential to the engine centerline) sectional view of an airfoil of the turbine blade of FIG. 3.

FIG. 4 also shows a camber line 190 in a transverse sectional view. Three-dimensionally, the camber line is a mathematical surface formed by the camber lines along all the sequential sections. The blade has a cooling passageway system with a plurality of spanwise passageways (passageway legs/segments/sections) within the airfoil. These legs include a series of passageways straddling the camber line arrayed from upstream to downstream. These are main body passageways. These include a leading first passageway 210, a second passageway 212, a third passageway 214, a fourth passageway 216, a fifth passageway 218, a sixth passageway 220, a seventh passageway 222, an eighth passageway 224, a ninth passageway 226, and a tenth passageway 228. The tenth passageway may feed a discharge slot 230 having an outlet falling at or near the trailing edge (e.g., an outlet 232 shifted slightly to the pressure side in this example). The leading passageway 210 may be an impingement cavity fed by the second passageway 212.

As is discussed further below, the example passageways 212, 214, 216, 218, 220, 224, and 226 have rounded-corner quadrilateral sections with the orientations of passageways 212, 214, 216, 218, 220, and 222 being such that corners of the cross-section fall on or near the camber line. Similarly, the leading corner of passageway 224 is on or near the camber line. When combined with skin passageways 310, 312, 314, 316, 318, and 320 on the pressure side and 322, 324, 326, 328, 330, and 332 on the suction side, these form generally X-cross-section sections of cast blade substrate between the passageways. Nevertheless, there may be alternative shapes to the cross-sections/footprints of the main body passageways and associated skin passageways.

The main body passageways may be cast by one or more main body cores or feedcores having corresponding/complementary sections. In one example, a main body core has sections forming the main body passageways and trailing edge slot. Some of the sections may extend from trunks that form inlet trunks in the blade root. As noted above, the impingement cavity 210 would not have its own trunk but rather would be fed from the next main passageway/cavity 212 serving as a feed cavity. In various embodiments, the remaining passageways may have individual trunks or there may be merger of trunks (e.g., one trunk from one root ID inlet diverges to feed two (or more) of the main body passageways). Also, one or more of the main body passageways (passageway legs) may be represented by a downpass fed by one of the other passageways (passageway legs) rather than as an up-pass with its own trunk. And a vane would likely have opportunities for a yet more different feed arrangement.

In casting, a shelled pattern (not shown) includes a ceramic stucco shell over pattern wax. The pattern wax was overmolded to a casting core assembly including a main body core or feedcore and, as discussed further below, a pressure side skin core and a suction side skin core. An example main body core is a single molded core having respective sections respectively complementary to the main body passageways. An example number of the main body passageways and core sections is ten, more broadly two to sixteen or two to twelve.

Although the example main body core is a single piece, alternative multipiece combinations are possible. As is discussed further below, the skin cores may each be a single piece or otherwise an integral unit.

Figure 5:
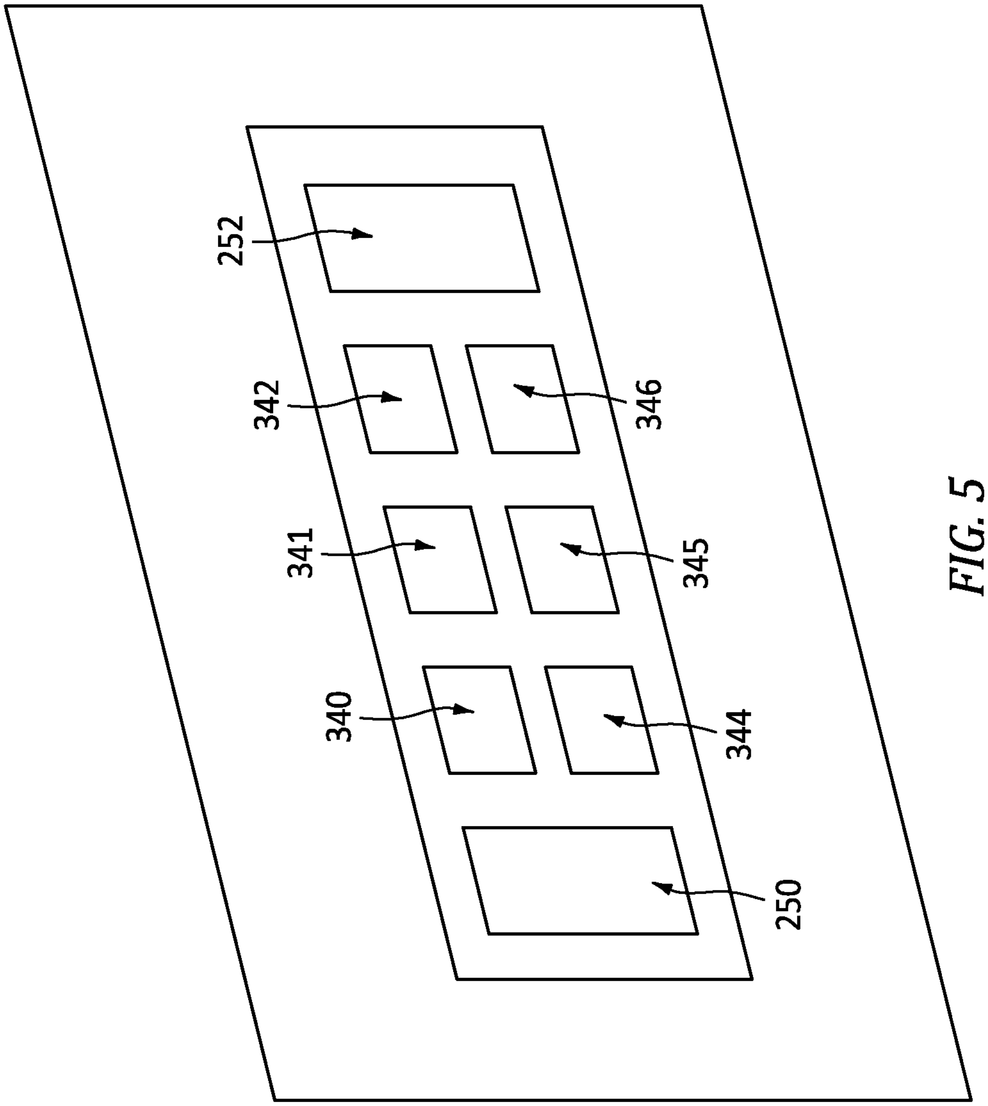
FIG. 5 is an inner diameter (ID) end view of a root of the turbine blade of FIG. 3.

The various spanwise passageways may connect to associated inlet ports (FIG. 5) in the root and may connect to associated outlet ports along the airfoil lateral surface or at the tip. FIG. 5 shows a leading inlet port (inlet) 250 and a trailing inlet port (inlet) 252. In this particular example, these two ports feed respective groups of the main body passageways. In this particular example, the leading inlet 250 feeds a trunk that branches to feed the first/leading four main body feed passageways 212, 214, 216, and 218 (and thus the leading passageway/cavity 210 via the feed passageway 212). Similarly, the trailing inlet 252 feeds a corresponding trunk that, in turn, branches to feed the trailing feed passageways 220, 222, 224, and 226 (the last of which feeds the passageway/cavity 228). Other configurations are possible with more or less or different branching.

In addition to these main body cooling passageways, as noted above, the example blade includes a series of a plurality of generally spanwise suction side passageways (passageway legs/segments/sections) and a series of a plurality similar pressure side passageways (e.g., as disclosed generally in the '857 patent, '364 patent, and '550 patent noted above). An example count per side is four to ten. The pressure side passageways include, from upstream to downstream and fore to aft, passageways 310, 312, 314, 316, 318, and 320. In various implementations, the pressure side passageways may be cast by a single pressure side casting core (skin core—e.g., molded ceramic). As artifacts of such casting, adjacent passageways may be connected by a spanwise distributed plurality of linking passageways 334 which are artifacts of core ties linking adjacent core sections which respectively cast the passageways. Similarly, the suction side passageways are, from fore to aft and streamwise upstream to downstream, passageways 322, 324, 326, 328, 330, and 332. And as with the other passageways, the suction side skin core has similar/complementary sections with similar (but negative) surfaces.

As with the main body feed passageways, the skin passageways may be fed by associated inlets. FIG. 5 shows inlets 340, 341, and 342 in the root ID face/end for feeding the pressure side skin passageways. In this example, each of these skin passageway inlets feeds a corresponding trunk which, in turn, branches to form two adjacent ones of the skin passageways. Thus, inlet 340 feeds passageways 310 and 312; inlet 341 feeds passageways 314 and 316; and inlet 342 feeds passageways 318 and 320. In a similar fashion, along the suction side, inlet 344 feeds passageways 322 and 324; inlet 345 feeds passageways 326 and 328; and inlet 346 feeds passageways 330 and 332. FIG. 3 shows the pressure side skin passageway inlets each receiving an inlet flow 700 that splits into branches 702 and 704 in the large and small passageway leg, respectively.

As is discussed further below, on each of the pressure side and suction side, each of the skin passageways nests between two adjacent main body passageways. To facilitate the nesting, the skin passageways and associated core sections may be of essentially rounded-corner triangular cross-section (e.g., as in the '364 patent) or otherwise similarly tapering depthwise inward (e.g., a rounded-corner trapezoidal cross-section/footprint). The base 336 (FIG. 4A) of the triangle or trapezoid falls adjacent to and essentially parallel to the adjacent pressure side or suction side surface spaced apart therefrom by a wall thickness. Forward 337 and aft 338 sides of the triangle or trapezoidal cross-section converge away from that side surface toward the camber line as do the complementary/associated surfaces of the casting cores. There may be outlet passageways (holes) 339 (e.g., drilled holes (e.g., via electrodischarge machining (EDM), laser drilling, or water jet) or cast holes (e.g., via RMC) from the respective pressure side and suction side skin passageways to the airfoil pressure side and suction side. The example outlet passageways 339 are film cooling holes for discharging a film cooling flow 720. The film cooling holes are angled relative to the associated pressure side or suction side surface so as to have a component in the direction of gas flow 722 (external gas with which the flows 720 merge) over the surface. Example film cooling holes have centerlines substantially off-normal to the associated pressure side surface or suction side surface (e.g., at least 200 off-normal, more particularly, 20° to 70° or 50° to 70° or 60° to 70° with higher off-normal angles being associated with holes other than from the leading edge cavity). As in the '550 patent, or otherwise, the pressure side passageways and suction side passageways may extend from inlet ports (FIG. 5) along the root. As in the '550 patent, or otherwise, to accommodate the change in cross-section between root and airfoil, the cross-sectional shapes of the various passageways may transition between airfoil and root as may their nesting arrangement and branching (if any). The casting cores may similarly change.

Figure 4A:
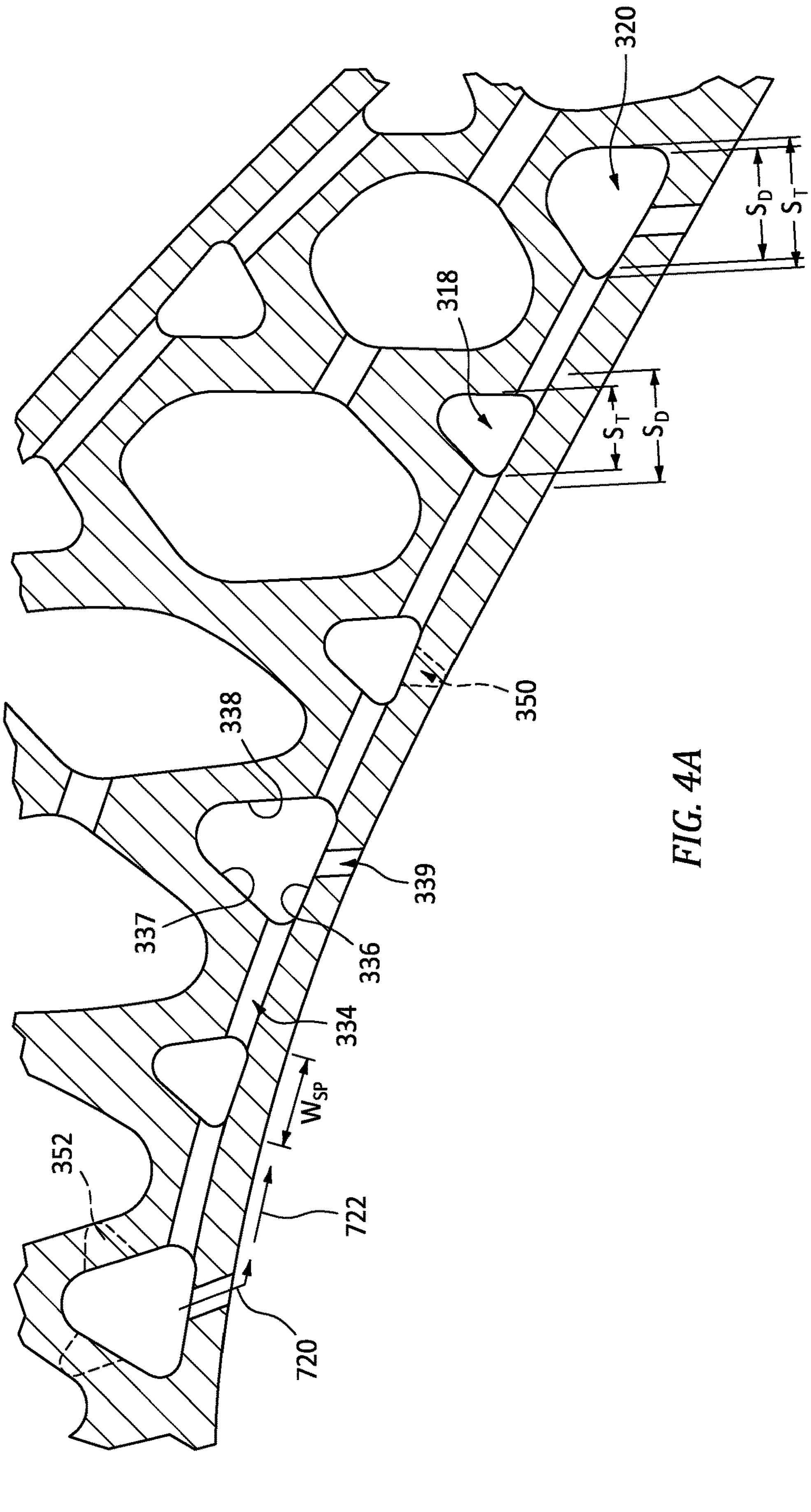
FIG. 4A is an enlarged view of a portion of the airfoil of FIG. 4.

The example pressure side passageways 310, 314, and 320 are generally larger than the adjacent pressure side passageways 312, 316, and 318. Measurement of the relative size of the larger passageways versus the smaller passageways may be done in any of numerous ways. As discussed further below, this size difference may be measured in one or both of cross-sectional area (e.g., as viewed in FIG. 4) or in a linear dimension. The size may be measured as a span $S_T$ transverse to the drilling direction/axis of the outlet holes 339. As noted above, this dimension $S_T$ is relevant relative to the available precision of drill placement for drilling the outlet holes 339. FIG. 4A also shows a span $S_D$ of drilling precision. In a baseline, $S_D$ may be greater than $S_T$ for some of the passageways with film cooling outlets. Thus, there may be part scrappage or reduced performance when an outlet hole does not fully intersect the associated skin passageway.

Typical values for drilling precision $S_D$ are between 1.5 mm and 2.0 mm. With larger $S_T$, the chances of the drilling missing in full intersection with the associated skin passageway is reduced. Because film cooling outlet holes 339 are connected to the larger skin passageways, $S_D$ should be less than or equal to the larger skin passageway transverse measurement $S_T$. Thus, the transverse passageway measurement $S_T$ should be greater than or equal to 1.5 mm and preferably greater than or equal to 2.0 mm for the larger skin passageways. Because film cooling outlets are not intended to be connected to the smaller skin passageways, the smaller skin passageway transverse measurement $S_T$ may be less than $S_D$. $S_D$ and $S_T$ may be measured transverse to the actual drilled film hole or the design specification for that drill hole. This may be complex for holes with a directional component parallel to the length of the passageway (the length being spanwise or close to spanwise and may be determined by the passageway median/centerline) For example, the drilling may have a component radially inward (so that the film outlet flow has a radially outward (tipward) component rather than being essentially directed to the trailing edge). Thus the relevant dimension transverse to the drilling axis would be at an angle off-normal to the passageway centerline. Or for simplicity, the transverse dimension $S_T$ may be measured in projection transverse to the length of the passageway (e.g., as shown in FIG. 4 even if the hole centerline/axis has a component out of the plane of the paper).

However, for the smaller passageways without actual film cooling holes, using an actual hole for the measurement frame of reference is moot. Accordingly, a proxy for a hole may be envisioned as the hole which might otherwise have been there if similar film cooling holes were used on both the small and large passageways. One proxy for such a non-existent hypothetical hole is one at the same angle relative to the local surface and local spanwise direction that the film cooling holes of the nearest larger passageway. This proxy hole may be at a similar location spanwise.

However, there may be simpler proxies that may be less precisely tied with the probability of intersecting the skin passageway with a drill. One linear dimension is a distance parallel to the adjacent pressure side surface or suction side surface and transverse to the passageway length itself. FIG. 4A shows this as $W_{SP}$. Example $W_{SP}$ (average or at one particular spanwise location) for the smaller passageways is less than or equal to 90% or 75% that of the larger passageways, more particularly, 40% to 90% or 50% to 80%. Example $W_{SP}$ (average or at one particular spanwise location) for the smaller passageways is less than or equal to 1.65 mm or 1.60 mm or 1.5 mm, more particularly, 0.7 mm to 1.65 mm or 0.9 mm to 1.5 mm. Example $W_{SP}$ (average or at one particular spanwise location) for the larger passageways is at least 1.50 mm or 1.60 mm or 1.8 mm or 2.0 mm, more particularly, 1.8 mm to 5.0 mm or 2.0 mm to 5.0 mm.

The cross-sectional area may be used as a proxy and be measured transverse to the length of the skin passageways. The cross-sectional area becomes relevant for off-normal drilling wherein the depth into the part (in view of the shape of the passageway) will influence the probability of intersection. Example cross-sectional areas of the smaller skin passageways 312, 316, and 318 may be up to 75% of those of the larger skin passageways 310, 314, and 320 and preferably up to 50% (e.g., 20% to 75% or 25% to 50%).

Such lengths/spans and cross-sectional area may be measured as mean, median, or modal values across that portion of the passageway within the airfoil. Such relative areas may be overall for a given side where the larger (or smaller) passageway area is defined as the mean of the mean, median, or mode for all passageways having (or not having) said film outlets. Or they may be just between a given smaller passageway and its one or two adjacent larger passageways.

Figure 6:
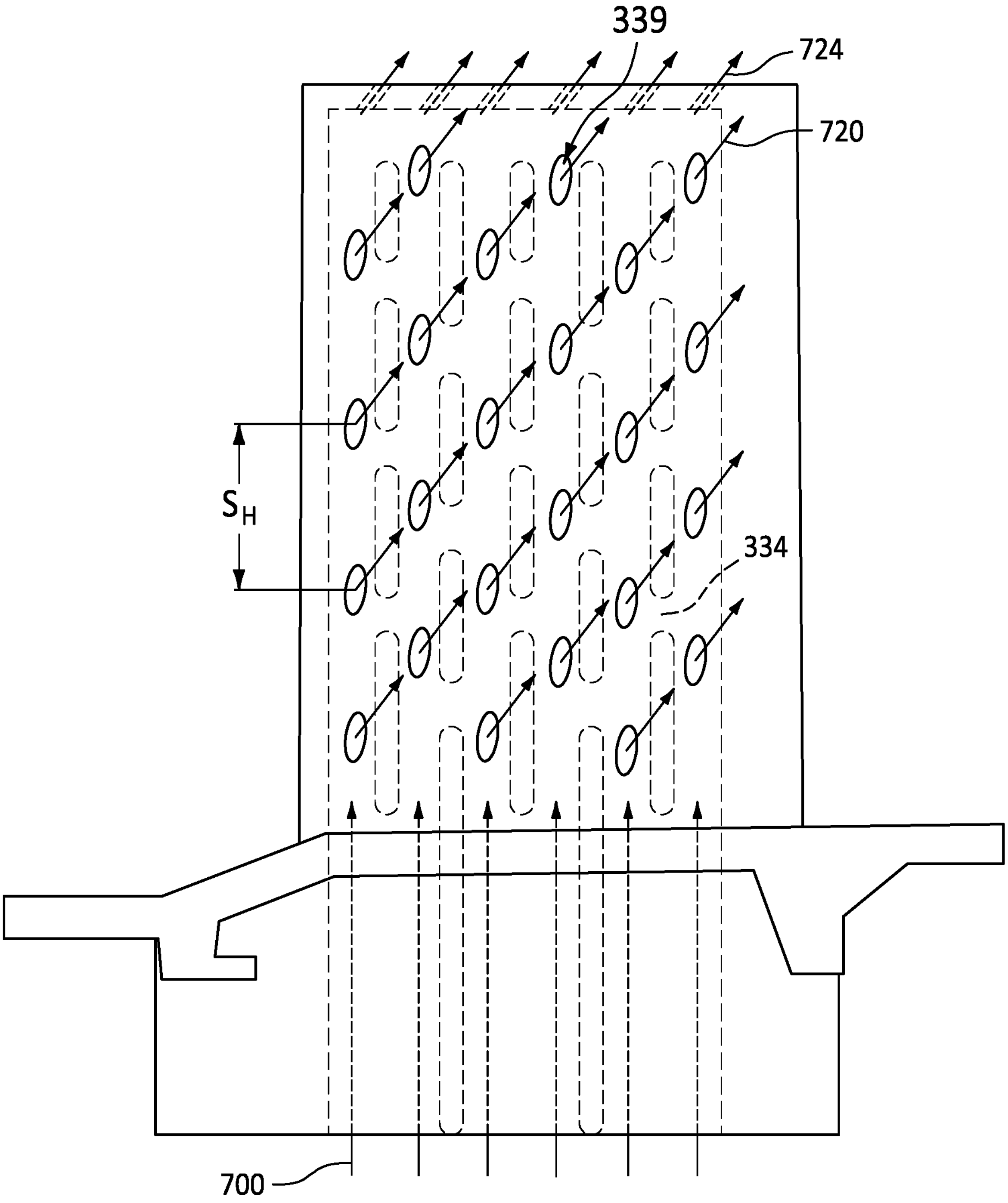
FIG. 6 (PRIOR ART)
FIG. 6 is a schematic side view of a prior art turbine blade forming a baseline for the blade of FIG. 3.
Figure 7:
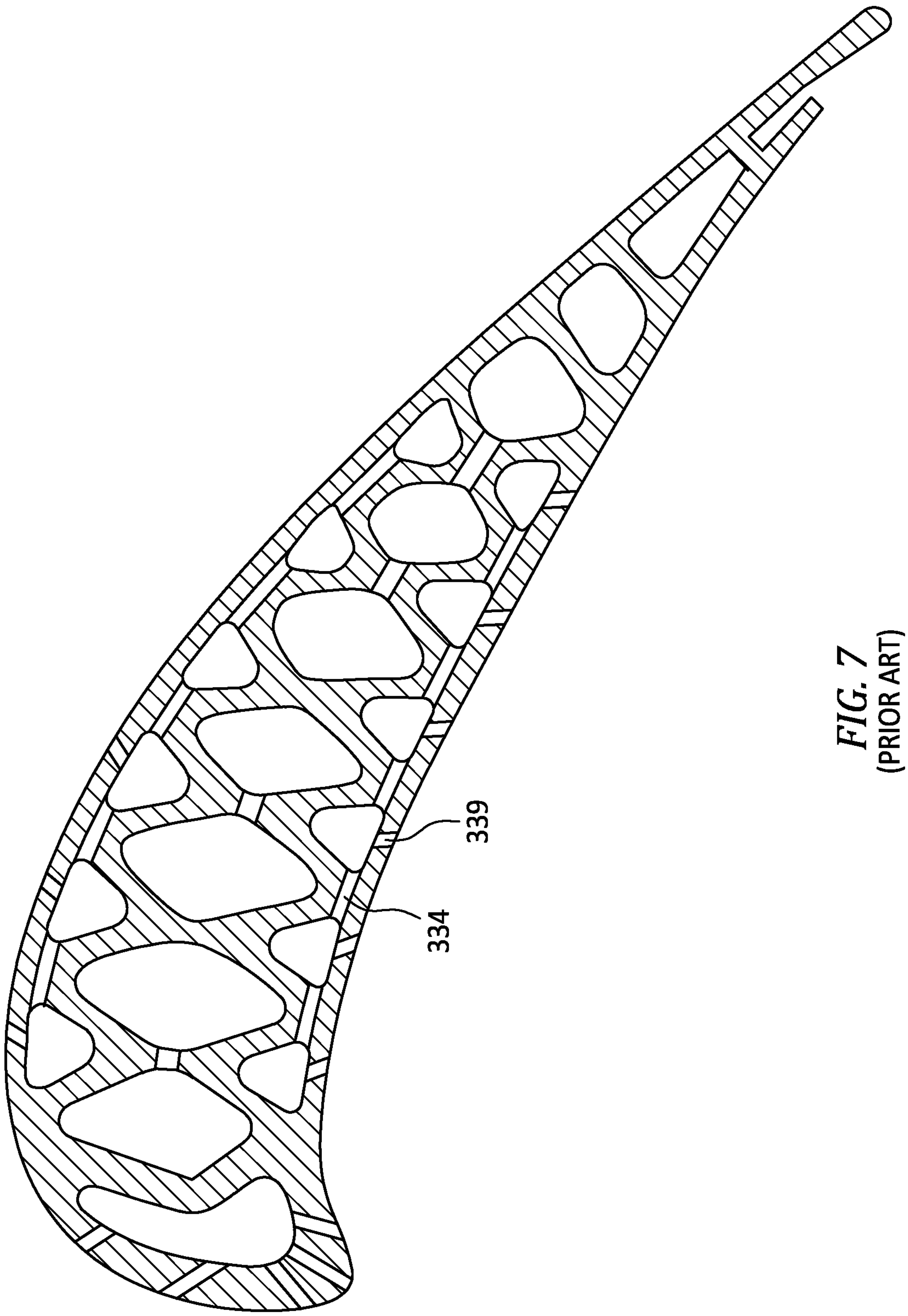
FIG. 7 (PRIOR ART)
FIG. 7 is a transverse sectional view of the airfoil of the turbine blade of FIG. 6.

FIGS. 6 and 7 show a hypothetical baseline airfoil wherein along each of the pressure side and suction side, the skin passageways (passageway legs) are of relatively consistent size (FIG. 7). Along the pressure side, each has a plurality of spanwise-arrayed film cooling outlet holes 339

(FIG. 6). Along the suction side, the first three passageways have film cooling outlet holes. The remaining three skin passageways have outlet holes at the airfoil tip and provide additional air to the first three passageways through passageways 334 cast by core ties. Along the baseline pressure side, wherein all skin passageways have film cooling outlets 339, there will be little passageway-to-passageway pressure drop and thus very little, if any, flow through the linking passageways 334, resulting in low heat transfer coefficients in the linking passageways that, in turn, cause high metal temperatures locally around the linking passageways.

In distinction, in the revised airfoil of FIGS. 3&4, the air from the flow 704 in smaller passageways 312, 316, and 318 will flow 706, 707 (FIG. 3) through to the adjacent larger passageway(s) to merge with the flow 702. In this example flow 706 is to the larger passageway fed by the same trunk and flow 707 is to a larger passageway fed by a different trunk. This will increase the heat transfer coefficient in the linking passageways 334 and result in lower metal temperature locally around the linking passageways and may more than compensate for the lost local cooling from the omitting of film outlets from the smaller passageways. The size of the skin passageway legs may uniformly alternate (e.g., vary large-small-large-small . . . ). For an even number, the illustrated alternative is large-small-large-small-small-large. The first two large passageways provide concentrated upstream (forward/leading) cooling while the switch to a final large also places some cooling near the trailing end.

Where two smaller passageways are adjacent, there may be a cross-flow induced by the exterior pressure difference. For example, the exterior pressure difference adjacent the skin passageways 314 and 320 may be such that air from the passageway 316 may not all pass to the passageway 314 but some may pass to the passageway 320 via the passageway 318 as flow 708 (from one smaller passageway to another). In addition to improving heat transfer in the linking passageways 334, combining rows of film cooling outlets by moving them from the smaller passageways 312, 316, 318 to the larger passageways 310, 314, 320 results in improved film cooling due to reduced hole-to-hole spacing SH. Moreover, by not having film cooling outlets in the smaller passageways, the smaller passageway sizes may be tailored to better meet allotted cooling flow levels instead of trying to maintain passageway transverse measurements greater than the drilling precision.

Figure 8:
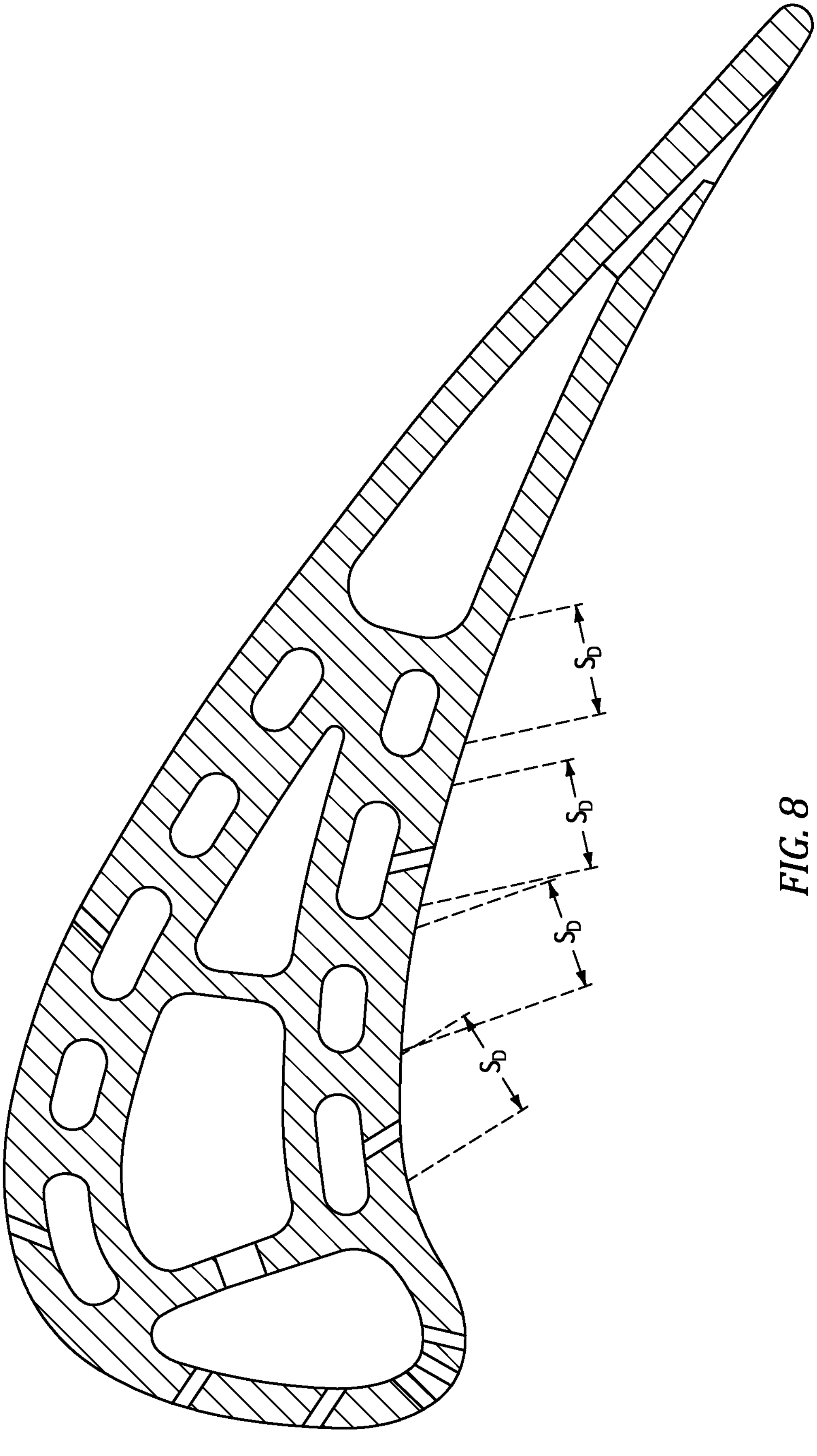
FIG. 8 is a transverse sectional view of an alternate airfoil.

FIG. 8 shows an alternative configuration of airfoil reflecting a different baseline (not shown). The example baseline has more conventional streamwise-tapering main body feed passageways along the camber line and skin passageways of generally obround or bent/curved obround section. In the baseline, the skin passageways are of generally similar $S_T$ to each other. Again, this may exceed $S_D$ for one or more passageways. Accordingly, FIG. 8 represents a similar modification of such a baseline that FIGS. 3&4 represent to FIGS. 6&7. These examples further differ from FIG. 4 in not having a depthwise overlap and nesting of the main body passageways and the skin passageways.

As additional artifacts of manufacture the pressure side passageways and suction side passageways have outboard/outward projections 350 (e.g., toward the respective pressure side 132 or suction side 134) and inboard/inward projections 352 (e.g., toward the adjacent main body feed passageway). As is discussed further below, these projections 350 and 352 are artifacts of locating core projections (bumpers) integrally molded with the associated skin cores for the pressure side passageways and suction side passageways. Example core projections/bumpers (and thus the passageway projections they cast) are frustoconical optionally with a rounded distal end/tip. Example conical half angle for such bumpers is 15°-30°, more particularly, 20°-30° or 20°-25°. Depending on tolerances, some of these projections 350 may penetrate to the adjacent pressure side or suction side, while others do not. Because these projections are part of the casting process, are normal to the airfoil surface, and do not reliably print out onto the airfoil surfaces, they cannot be used as film cooling outlets. Because they are normal to the surface, any air that does leak out through these projections will blow off the surface of the airfoil and will quickly get mixed in with the gaspath and not provide a layer of film isolating the gaspath air from the airfoil surface.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Although illustrated in the context of a blade, the basic geometries and flows and associated casting cores and methods may be used to provide similar passageways and air flows in other articles. As noted above, this includes other forms of blades as well as vanes. Additionally, such cores and methods may be used to cast such passageways in non-airfoil elements. One example is struts that extend through the gaspath. Additional modifications may be made for yet further different elements such as blade outer airseals (BOAS). In an example BOAS, the cores (and resulting passageways) may extend circumferentially or longitudinally relative to the ultimate position of the BOAS in the engine. For example, the base of a triangular skin core segment/section/leg may fall along the OD surface of an ID wall of the BOAS. In such a situation, a second skin core may be more radially outboard or may be deleted altogether. In one group of examples the lengths of the passageways may be transverse to the gaspath so that the skin passageways are sequentially arrayed from upstream to downstream along the gaspath. Accordingly, other embodiments are within the scope of the following claims.

The invention claimed is:

1. A turbine engine airfoil element comprising:
an airfoil having:
a pressure side and a suction side;
a plurality of spanwise passageways including:
a plurality of main body passageways along a camber line; and
a plurality of skin passageways along the pressure side and comprising:
first skin passageways each having a plurality of film cooling outlets to the pressure side; and
second skin passageways each lacking film cooling outlets to the pressure side; and
linking passageways along the pressure side between the first skin passageways and the second skin passageways,
wherein:
for at least one of the second passageways two respective pluralities of said linking passageways connect to two said first passageways; and the first skin passageways and second skin passageways are separately directly fed from one or more inlets of the airfoil element.

2. The turbine engine airfoil element of claim 1 wherein:

at at least one spanwise location, the second skin passageways have lower cross-sectional areas than the first skin passageways.

3. The turbine engine airfoil element of claim 1 wherein:

the second skin passageways have lower average cross-sectional areas than the first skin passageways.

4. The turbine engine airfoil element of claim 3 wherein:

the second skin passageways mean cross-sectional areas are 20% to 75% of the first skin passageways average cross-sectional areas.

5. The turbine engine airfoil element of claim 1 wherein:

the plurality of skin passageways along the pressure side comprises at least two said second skin passageways and at least two said first skin passageways.

6. The turbine engine airfoil element of claim 1 wherein:

the plurality of spanwise passageways further include:

a plurality of suction side passageways including:

first skin passageways each having a plurality of film cooling outlets to the suction side; and second skin passageways each lacking film cooling outlets to the suction side; and the airfoil further comprises a plurality of linking passageways along the suction side between the suction side first skin passageways and the suction side second skin passageways.

7. The turbine engine airfoil element of claim 6 wherein:

the pressure side skin passageways and the suction side skin passageways have rounded-corner triangular or quadrilateral cross-section.

8. The turbine engine airfoil element of claim 6 wherein:

the pressure side first skin passageways have a median transverse dimension at least 2.0 mm; and the pressure side second skin passageways have a median transverse dimension not more than 1.5 mm.

9. The turbine engine airfoil element of claim 6 comprising:

four to ten said pressure side skin passageways and four to ten said suction side skin passageways.

10. The turbine engine airfoil element of claim 6 wherein:

adjacent pressure side passageways connect to each other via a plurality of linking passageways;

adjacent suction side passageways connect to each other via a plurality of linking passageways; and the linking passageways extend less deeply into the airfoil cross-section from the respective associated pressure side or suction side than do the adjacent pressure or suction side passageways.

11. The turbine engine airfoil element of claim 6 wherein:

the first skin passageways and the second skin passageways each extend over at least 50% of a span of the airfoil.

12. The turbine engine airfoil element of claim 6 being a blade having an attachment root wherein:

the main body passageways extend from associated inlets at an inner diameter (ID) end of the root; and the first and second pressure side passageways and first and second suction side passageways extend from associated inlets at the inner diameter (ID) end of the root.

13. A turbine engine including the turbine engine airfoil element of claim 6.

14. The turbine engine of claim 13 wherein:

the turbine engine airfoil element is a turbine section blade or vane.

15. A method for manufacturing the turbine engine airfoil element of claim 1, the method comprising:

assembling to each other:

a feedcore having sections for forming the plurality of main body passageways; and a skin core having sections for forming the plurality of plurality of skin passageways and linking passageways;

overmolding the assembly with a fugitive;

shelling the fugitive to form a shell;

casting alloy in the shell; and deshelling and decoring the cast alloy.

16. The method of claim 15 wherein:

the fugitive is wax and the shell is dewaxed prior to the casting.

17. The method of claim 16 further comprising:

molding the feedcore, the pressure side skin core, and the suction side skin core of ceramic material.

18. A method for using the turbine engine airfoil element of claim 1, the method comprising:

driving an airflow through the plurality of spanwise passageways;

said airflow exiting through the plurality of outlets; and said airflow passing from the second skin passageways to the first skin passageways through the linking passageways.

19. The method of claim 18 wherein:

from at least one of the second skin passageways, said airflow passes to two adjacent said first skin passageways.

20. A method for using a turbine engine airfoil element, the turbine engine airfoil element comprising:

an airfoil having:

a pressure side and a suction side;

a plurality of spanwise passageways including:

a plurality of main body passageways along a camber line; and a plurality of skin passageways along the pressure side and comprising:

first skin passageways each having a plurality of film cooling outlets to the pressure side; and second skin passageways; and linking passageways along the pressure side between the first skin passageways and the second skin passageways, the method comprising:

driving an airflow through the plurality of spanwise passageways from one or more inlets;

said airflow exiting through the plurality of outlets; and said airflow passing from the second skin passageways to the first skin passageways through the linking passageways so that a majority of airflow entering the second passageways passes to the first passageways, the airflow from at least one of the second passageways passing directly to two said first passageways via two respective pluralities of said linking passageways.

21. A turbine engine airfoil element comprising:

an airfoil having:

a pressure side and a suction side;

a plurality of spanwise passageways including:

a plurality of main body passageways along a camber line; and a plurality of skin passageways along the pressure side and comprising:

first skin passageways each having a plurality of drilled film cooling outlets to the pressure side; and second skin passageways each lacking film cooling outlets to the pressure side; and linking passageways between the first skin passageways and the second skin passageways, wherein:

for at least one of the second passageways two respective pluralities of said linking passageways connect to two said first passageways; and wherein the first skin passageways and second skin passageways provide means for improving a drilled intersection of the drilled film cooling outlets with the first skin passageways.

22. A turbine engine component comprising:

a gaspath-facing side;

a plurality of passageways including:

a plurality of main body passageways along a camber line; and a plurality of skin passageways along the gaspath-facing side and comprising:

first skin passageways each having a plurality of drilled film cooling outlets to the gaspath-facing side; and second skin passageways each lacking film cooling outlets to the gaspath-facing side; and linking passageways between the first skin passageways and the second skin passageways, wherein:

the first skin passageways have larger cross-sectional area than the second skin passageways for improving a drilled intersection of the drilled film cooling outlets with the first skin passageways;

the first skin passageways are coupled to inlets other than via the linking passageways; and the second skin passageways are coupled to inlets other than via the linking passageways.

23. The turbine engine component of claim 22 wherein:

the plurality of skin passageways are sequentially arrayed from upstream to downstream along the gaspath.

24. The turbine engine component of claim 22 wherein:

the turbine engine component is an airfoil element having an airfoil; and the gaspath-facing side is a pressure side of the airfoil.

25. A turbine engine airfoil element comprising:

an airfoil having:

a pressure side and a suction side;

a plurality of spanwise passageways including:

a plurality of main body passageways along a camber line; and a plurality of skin passageways along the pressure side and comprising:

first skin passageways each having a plurality of film cooling outlets to the pressure side; and second skin passageways each lacking film cooling outlets to the pressure side; and linking passageways along the pressure side between the first skin passageways and the second skin passageways, wherein:

the first skin passageways and second skin passageways are directly fed from one or more inlets of the airfoil element; and the second skin passageways mean cross-sectional areas are 20% to 75% of the first skin passageways average cross-sectional areas.

* * * * *